US005707145A

United States Patent [19]

Lücke et al.

[11] Patent Number: 5,707,145

[45] Date of Patent: Jan. 13, 1998

[54] METHOD OF CONCHING BULK CHOCOLATE IN A MIXING APPARATUS

[75] Inventors: Roland Lücke; Thomas Meyer; Bernhard Lüke, all of Paderborn, Germany

[73] Assignee: Gebrueder Loedige Maschinenbau-Gesellschaft mbH, Paderborn/Fed., Germany

[21] Appl. No.: 663,093

[22] PCT Filed: Dec. 21, 1994

[86] PCT No.: PCT/DE94/01513

§ 371 Date: Jun. 20, 1996

§ 102(e) Date: Jun. 20, 1996

[87] PCT Pub. No.: WO95/17951

PCT Pub. Date: Jul. 6, 1995

[30] Foreign Application Priority Data

Dec. 30, 1993 [DE] Germany .......................... 43 44 995.6

[51] Int. Cl.$^{6}$ .......................... A23G 1/16

[52] U.S. Cl. .......................... 366/279; 366/325.1; 426/606; 426/519

[58] Field of Search .......................... 366/279, 325.1, 366/327.1, 327.4, 329.1, 330.1, 330.3, 330.4, 330.5, 342, 343, 345; 426/660, 519

[56] References Cited

U.S. PATENT DOCUMENTS

| | | | |
|---|---|---|---|
| 2,109,077 | 2/1938 | Straight | 366/342 |
| 2,750,161 | 6/1956 | Simmons | 366/297 |
| 2,802,650 | 8/1957 | Straight | 366/343 |
| 3,027,102 | 3/1962 | Lodige | 241/98 |

FOREIGN PATENT DOCUMENTS

| | | | |
|---|---|---|---|
| 1383354 | 11/1964 | France . | |
| 1276986 | 9/1968 | Germany . | |
| 1782585 | 10/1971 | Germany . | |
| 2801460 | 7/1979 | Germany . | |
| 2802876 | 7/1979 | Germany . | |
| 3034200 | 5/1982 | Germany . | |
| 3344531 | 6/1985 | Germany . | |
| 3523060 | 11/1986 | Germany . | |
| 1722556 | 3/1992 | U.S.S.R. | 366/330.1 |
| 2158365 | 11/1985 | United Kingdom . | |

*Primary Examiner*—Tony G. Soohoo
*Attorney, Agent, or Firm*—Paul Vincent

[57] ABSTRACT

Bulk chocolate is added into a mixing apparatus whereby a plurality of conching tools (10) is fixed together with several others, on a shaft (11). The shaft (11) is rotatably mounted in end walls (21) of a horizontal drum (12). The ends of the mixing tools (10) are located a short distance from the inside wall (18) of the drum, and the shaft (11) has a drive which turns the direction of rotation of the shaft (11), the clearance between the leading edge (19) of each tool (10) and the inside wall (18) of the drum is greater than the clearance between the trailing edge (20) of the tool and the inside wall (18) of the drum. The shaft (11) is rotated to press the bulk chocolate between a bottom wall of mixing tools (10) and the inside surface of the drum (12) whereby the bulk chocolate first enters the leading edge (19) to experience a pressing force as it travels across from the leading region to the trailing region of the mixing tool (10).

7 Claims, 3 Drawing Sheets

METHOD OF CONCHING BULK CHOCOLATE IN A MIXING APPARATUS

BACKGROUND OF THE INVENTION

The invention concerns the use of a mixing apparatus comprising a drum with a shaft having a drive mechanism rotatably mounted therein for conching, in particular of bulk chocolate, wherein a plurality of mixing tools are attached to the shaft.

Mixing tools of this kind are known in the art through German patent manuscript 1 276 986.

This type of mixing tool has been known in the art for decades, and they are utilized in largely horizontal drums in order to mix solid and liquid bulk materials of all kinds. The tools are attached to a shaft which is mounted in a rotatable fashion in the drum. When installing the mixing tools one must pay particular attention to the installation location of the mixing tools relative to the inner wall of the drum since the mixing tools should have a small separation from the drum inner wall. Material deformation can lead to a blocking of the centrifuge mechanism in the drum in the event of improper configuration of the centrifuge mechanism (shaft and mixing tools) and their positioning relative to the drum. That is to say, even without any product in the mixing device, it is possible for material deformation (of the drum and/or the centrifuge mechanism) to occur and due to the intrinsic weight of the centrifuge mechanism, individual mixing tools can seat on the drum surface to block the centrifuge mechanism in the drum. This problem can always be addressed if one arranges the mixing tools sufficiently far from the inner surface of the drum such that even under unfavorable circumstances, direct contact between the mixing tools and the drum is not possible.

Such a simple measure cannot be effectively utilized in high efficiency mixing apparatus since it normally leads to undesired product deposits on the inner surface of the drum and creates gaps which are not actively utilized in the desired fashion during mixing and product processing.

Plough blade scoops are known in the art as published in DE PS 1 276 986. These mixing tools are arranged in a drum in such a fashion that a wedging of the product in the gap between the mixing tool and the inner surface of the drum cannot take place. This is done with the mixing tool using a tapered gap which opens opposite to the rotation direction of the centrifuge mechanism. This, in turn, is effected by displacing the bottom wall of the mixing tools, by appropriately slanting same, or by tilting the mixing tool itself.

Other mixing tools have become known in the art through DE 28 02 876 C2 and GB 2158365 A both concerning the mixing of largely solid bulk material. This bulk material cannot, however, enter into and be compressed between the inner wall of the drum and the outer edge of the mixing tool to wedge the bulk material and thereby slow or even stop the mixing tool.

The mixing tool of DE 28 02 876 C2 utilizes a bulk material comprising lighter and heavier particles. The axial transport of the mixing tool is increased or decreased by the attachment of the mixing tools and the configuration of the side walls. This transport effect cannot, however, be achieved with the mixing tools which are shown opening in the direction of rotation in the figure of DE 28 02 876 C2, since bulk material entering between the inner wall of the drum and the mixing tool would cause the mixing process to come to a stop. DE 28 02 876 C2 does not disclose any reason for the particular tilted position shown.

GB 2158365 A refers to U.S. Pat. No. 3,027,102 with regard to the constructive configuration of the mixing tools, wherein the outer sides of the mixing tools are curved in a manner adapted to the mixing drum. With the mixing device configuration according to GB 2158365 A a mixture is to be brought relatively rapidly into a state in which its size can be reduced, wherein the original mixture can comprise dried powder and other particles to which a fluid can be added at a later time in order to form a mash. This originally dried mixture would, however, enter between the inner wall of the drum and the mixing tool to stop the mixing process due to the, in contrast to U.S. Pat. No. 3,027,102, tilted GB 2158365 A mixing tools (FIGS. 2 and 3) which open in the direction of rotation.

Although the figures of DE 28 02 876 C2 and GB 2158365 A appear to disclose mixing devices having mixing tools opening in the direction of rotation such an arrangement of the mixing tools is, however, not actually possible for the above mentioned reasons.

It is therefore the purpose of the present invention to improve a mixing tool such as the conventional plough blade scoop in such a fashion that, in addition to the mixing procedure, the restructuring of materials for the conching of products is advantageously influenced.

SUMMARY OF THE INVENTION

This purpose is achieved in accordance with the invention through the use of a mixing apparatus of the above mentioned kind whose shaft has a plurality of mixing tools attached thereto which end at a small separation from the inside surface of the drum, wherein the mixing tools, as viewed in the direction of rotation of the tools, have a larger separation from the inside surface of the drum in the leading region than in the trailing region so that the arrangement of the mixing tools relative to the inside surface of the drum facilitates a wide spread increased energy deposition into the product being processed over the entire length of the drum.

The use of the mixing apparatus in accordance with the invention has the advantage that the product being conched, which is located between the mixing tool and the inner surface of the drum, is subjected to pressing during rotation of the mixing tool which causes a change in the product in individual grains or in individual volume regions of the bulk.

With chocolate bulk material the "melt" can be influenced in a defined manner. The aroma of a bulk material of this type can be influenced. The arrangement of the mixing tools relative to the inner surface of the drum in accordance with the invention allows for an increased energy input into the product being processed which is distributed over a wide area along the entire length of the drum. The smallest particles within the chocolate bulk are restructured without leading to auxiliary reactions, undesired secondary particles, and improper influencing of taste.

In this manner it is possible to influence the the product state in a defined manner to cause the product to have, for example, a changed viscosity, a changed particle surface structure, a changed aroma or a changed color after treatment in the apparatus in accordance with the invention. With the apparatus in accordance with the invention, it is possible to induce product restructuring as an integral part of a mixing procedure which cannot be achieved by a mill or a press in an economical or reproduceable fashion.

A substantial aspect of the invention is that it is possible to induce restructuring of products by adjusting the angle between the mixing element and the inner wall of the drum for the processing of bulk materials in mixers, dryers, granulators and/or reactors. Towards this end it is of singular importance that, during treatment, the product being conched is subjected to wide surface area pressing at the end region of a mixing tool. The forces acting on the product being conched increase from the tip region of the mixing tool towards the end region.

In a preferred embodiment, the mixing tools have concave or convex side walls which join at a tip in the forward region, end in a line of intersection, but widen towards their ends in the back region, and both side walls are joined to each other at close separation from the inner surface of the drum via a bottom wall which is largely adapted to the curvature of the drum and which joins the side walls to each other in a smooth and step-free fashion. In this manner, a restructuring of the product is strongly enhanced since this type of mixing tool has good specific mixing efficiency. The product located in the gap between the mixing tool and the inner surface of the drum is frequently exchanged so that a homogeneous and even treatment of the entire product located in the drum is guaranteed. The side surfaces of this type of mixing tool extend radially away from the bottom wall towards the inside of the drum volume to end along a line of intersection between the side surfaces. The mixing body is, for example, hollow with two side surfaces, a bottom wall and a back wall. The mixing arm is located opposite to the bottom wall and joined to the mixing body. The mixing body and the mixing arm constitute the mixing tool.

In a further embodiment of the invention the individual mixing tools are arranged on the shaft in such a fashion that the individual bottom walls sweep across the entire inner surface of the drum during a rotation of the shaft through 360°.

This has the advantage that open volume regions in the drum, in which the product could have been processed, are avoided during a mixing and restructuring process. As a result a constant homogeneous product results within the entire product batch which has the same product properties within individual regions.

In a further embodiment of the invention, the mixing tool or tools are configured in the inner region of the drum as full-size tools symmetric with respect to an axis. This has the advantage of creating product distribution within the mixing volume having equal product portioning in the event of displacements within the bulk good or bulk material being processed. In this fashion high mixing quality factors can be achieved.

In an improvement of the invention half-size tools are arranged on a shaft within the drum in addition to the full-size tools. These half-size tools are associated with the end walls which close the drum at both sides. The half-size tools have a larger separation from the inner surface of the end wall in the front region than in the back region. The half-size tools can also induce sideward pressing effects which likewise enhance the restructuring processes in the product.

In addition the bottom wall or walls of the mixing tools can have an additional coating material. In this fashion excessive material friction during the course of a mixing and restructuring process can be avoided.

With the half-size tools, the side surfaces lying directly across from the end walls of the drum are adapted to the contours of the inner side of the end walls and the side walls of the half-size mixing tools facing the inner volume of the drum are concave or convex. In this fashion the effects of the half-size mixing tools are largely similar to those of the full-size tools.

Further advantages can be derived from the description and the accompanying drawing. The above mentioned features and those to be further described below in accordance with the invention can be utilized in each case individually or collectively in arbitrary combination. The embodiments mentioned are not to be considered as exhaustive enumeration rather have exemplary character only.

The invention is represented in the drawing and is further explained in connection with the embodiments:

DESCRIPTION OF THE PREFERRED EMBODIMENT

Figure 1:
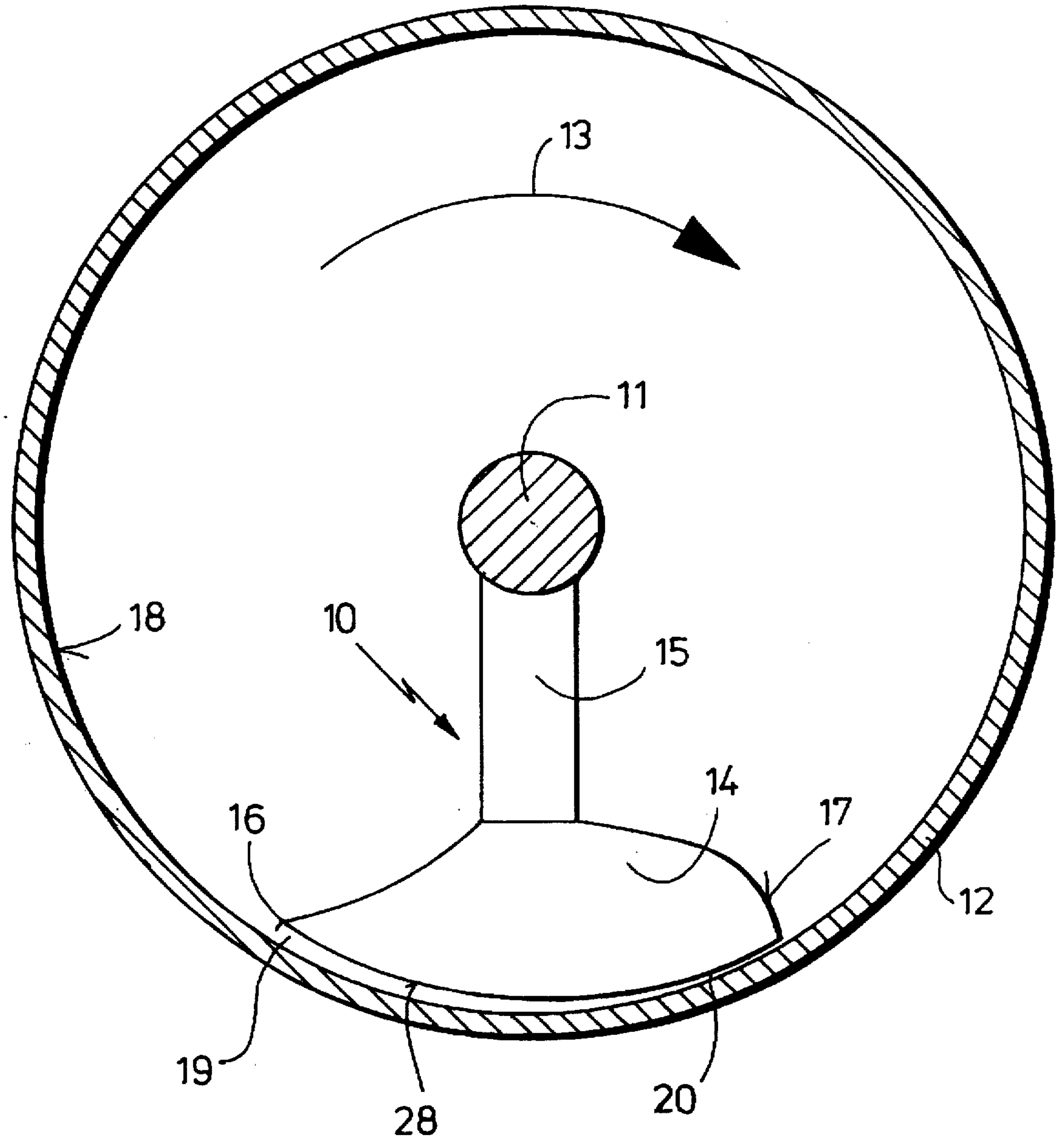
FIG. 1 shows a configuration of a mixing tool in accordance with the invention relative to the inner surface of a drum in cross-section.

The individual figures of the drawing show the object in accordance with the invention in a partially highly schematic manner and are not to be taken to scale. The objects of the individual figures are represented in such a fashion that their construction is clearly shown.

FIG. 1 shows a side view and a cut view of a mixing tool 10, with same being attached to a shaft 11 with the shaft 11 being arranged together with the mixing tool 10 within a drum 12. A plurality of mixing tools 10 on the shaft 11 constitute a centrifuge mechanism. The rotational direction of the centrifuge mechanism is indicated by the direction of arrow 13. The mixing tool 10 comprises a mixing body 14 and a mixing arm 15. The mixing arm 15 is either attached to the shaft in a removable fashion (screw connection within a pocket) or the mixing arm 15 is welded to the shaft 11.

The mixing body 14 shown in side view has a tip 16 in the rotational direction of the centrifuge mechanism of arrow direction 13 and the back end of the mixing body 14 is formed from a back wall 17. The mixing body 14 is further separated from an inner surface of the drum 18 in the front region 19 than in the back region 20. In the event that a product to be mixed and restructured gains access to the gap between the mixing body 14 and the inner surface of the drum 18, the product is pressed by the rotating centrifuge mechanism onto the inner surface of the drum 18 to produce interparticulate frictional energy.

Figure 2:
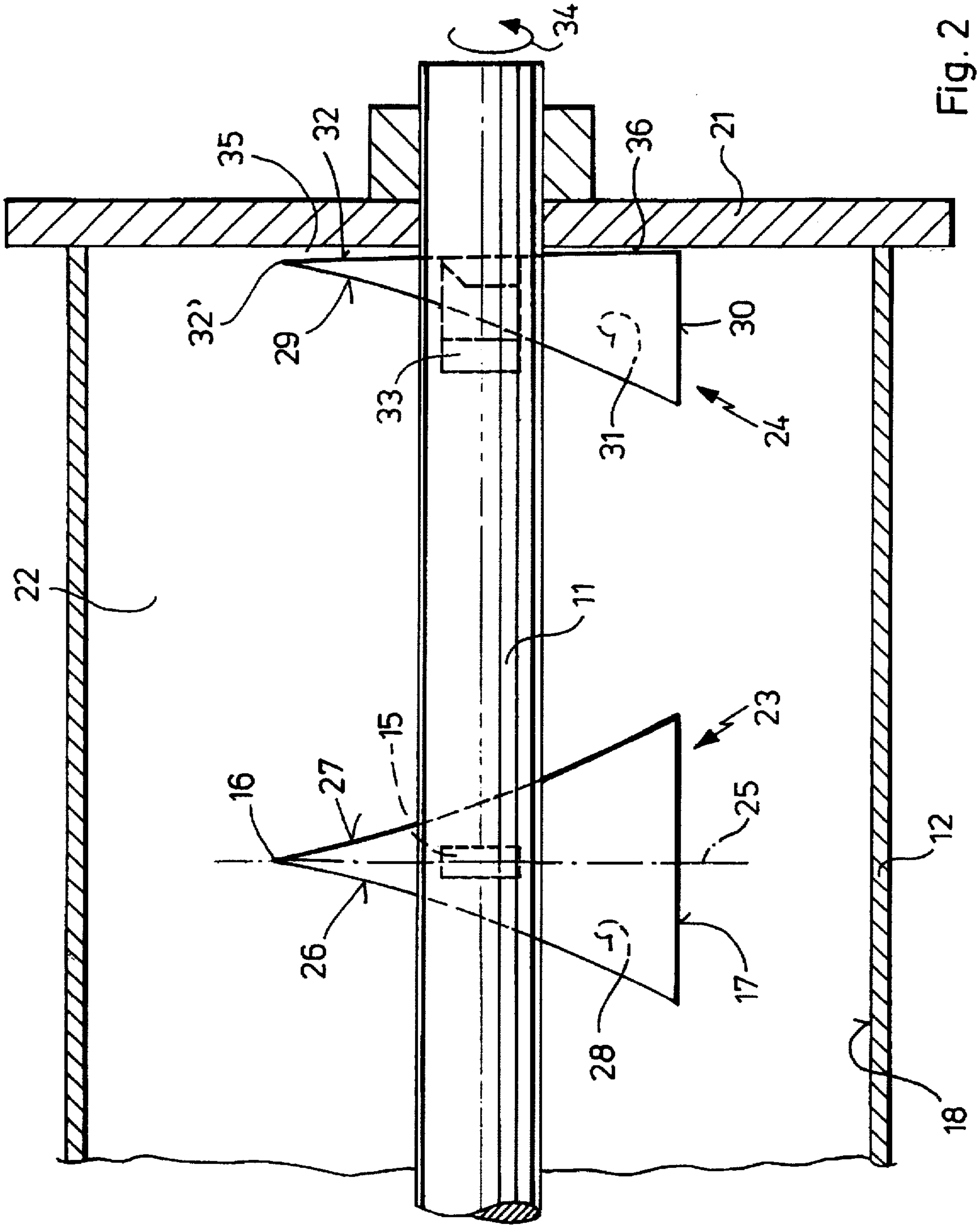
FIG. 2 shows a configuration in accordance with the invention of a full-size mixing tool and a half-size mixing tool in a drum with an end wall, in a cut and plan view.

FIG. 2 shows a plan view of a cut of a drum 12 having an end wall 21 and an inner volume 22. The shaft 11 is mounted at the end walls 21 with only one end wall 21 being shown in FIG. 2. The mounting itself is shown in a highly schematic fashion. A full-size mixing tool 23 and a half-size mixing tool 24 are arranged on the shaft. The term mixing tool 10 refers to both full-size mixing tools 23 as well as to half-size mixing tools 24. The separation of the full-size mixing tool 23 from the half-size mixing tool 24 does not correspond to the actual configuration of these tools on the shaft 11. In addition, the mixing tools 23, 24 are always arranged in a mutually displaced fashion around the circumference. The actual configuration of the mixing tools 23, 24 around the circumference of the shaft 11 cannot be extracted from FIG. 2.

The full-size mixing tool 23, a plurality of which, depending on the size of the drum 12, are arranged on the shaft 11, is symmetrically constructed with respect to an axis 25. The full-size mixing tool 23, is a plough blade scoop, and comprises a side surface 26 and a side surface 27. The two side surfaces 26, 27 are joined to each other via a bottom wall 28. The bottom wall 28 is smooth and is adapted to the contours of the inner surface of the drum 18. The transitional region between the bottom wall 28 and the side walls 26, 27 is smooth and without steps. The side walls 26, 27 join in the rotational direction of the shaft 11 at the tip 16. The bottom wall 28 widens in a direction opposite to the rotational direction of the shaft 11 and bottom wall 28 and the side walls 26, 27 are commonly joined in the trailing region via the back wall 17. The full-size mixing tool 23 is joined to the shaft 11 via mixing arm 15. The side walls 26, 27 are concave in FIG. 2 as is conventional with plough blade scoops. The full-size mixing tool 23 has a larger separation from the inner surface of the drum 18 in the vicinity of the tip 16 than in the vicinity of the back wall 17. The width of the full-size mixing tool 23 in the vicinity of the back wall 17 is determined by requirements as to the magnitude of interparticulate frictional energy which should be produced in the product being processed.

The half-size mixing tool 24 comprises a concave side wall 29, a back wall 30, a bottom wall 31, and a side wall 32, which corresponds to the contours of the side wall 21. The side wall 29, the back wall 30, the bottom wall 31, and the side wall 32 form a hollow body which is attached to the shaft 11 via a mixing arm 33. The side wall 29, the back wall 30 and the bottom 31 form a tip 32' in the rotational direction of the shaft 11. The rotational direction of the shaft 11 is indicated with an arrow 34 in FIG. 2. The half-size mixing tool 24 is further separated from the inner surface of the side wall 21 in the forward side region 35 than in the backward side region 36. Interparticulate frictional energy is produced within the product being processed when the product enters into the gap between the half-size mixing tool 24 and the inner surface of the side wall 21.

Figure 3:
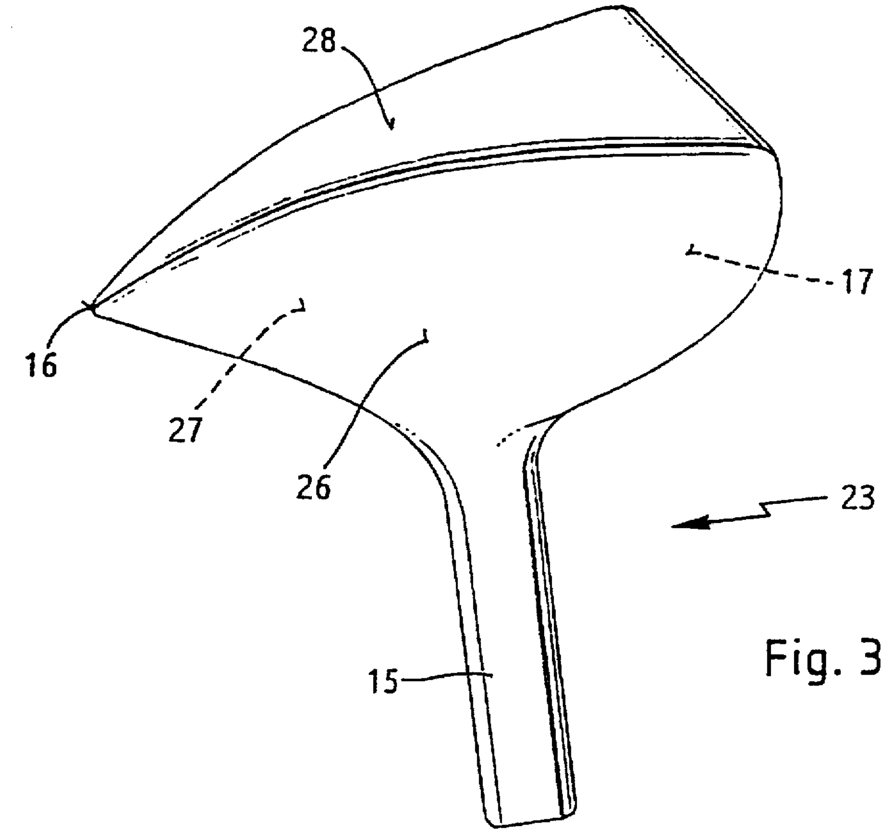
FIG. 3 shows a full-size mixing tool in accordance with the invention in a three-dimensional representation.

FIG. 3 shows a perspective view of a full-size mixing tool 23 as shown in the various views of FIG. 1 and FIG. 2. The full-size mixing tool 23 is formed from curved, concave side walls 26 and 27 which join, together with the back wall 17, at the mixing arm 15. The full-size mixing tool 23 terminates in a line of intersection 37 between the side walls 26, 27 in the region extending from the tip 16 towards the mixing arm 15. The side walls 26, 27 widen towards the back wall 17 and are connected to each other via the bottom wall 28. The bottom wall 28 is also connected to the back wall 17. The side walls 26, 27, the bottom wall 28 and the back wall 17 are joined smoothly to each other and, in the region of the mixing arm 15, the side walls 26, 27 as well as the back wall 17 terminate smoothly at the mixing arm 15.

Figure 4:
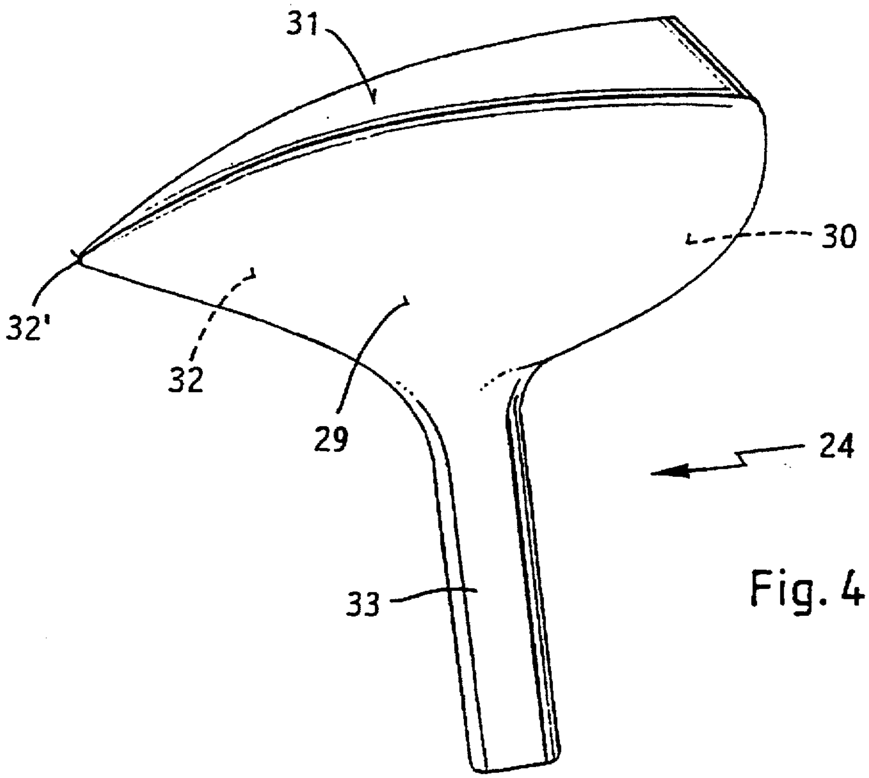
FIG. 4 shows a half-size mixing tool in accordance with the invention in a three-dimensional representation.

FIG. 4 likewise shows a perspective view of a half-size mixing tool 24 with same, for example, being arranged at the end wall 21 of FIG. 2. The half-size mixing tool 24 comprises a curved concave side wall 29, a flat side wall 32, a bottom wall 31 and a back wall 30. The walls transform smoothly from below into mixing arm 33 and a line of intersection (edge) 38 between the individual walls (side walls, back wall, bottom wall) is smooth and step-free.

Both the full-size mixing tools 23 as well as the half-size mixing tools 24 have bottom walls 28, 31 which smoothly join the adjacent walls while forming a plough edge.

A conching tool 10 is fixed together with several others on a shaft 11. The shaft 11 is rotatably mounted in end walls 21 in a horizontal drum 12. The ends of the mixing tools 10 are located at a short distance from the inside wall 18 of the drum and the shaft 11 has a drive which turns the tools in the direction of the arrow 13. As viewed in the direction of rotation of the shaft 11, the clearance between the leading edge 19 of each tool (which may be a full-size or a half-size tool) and the inside wall 18 of the drum is greater than the clearance between the trailing edge 20 of the tool and the inside wall 18 of the drum.

We claim:

1. Method for conching bulk chocolate in a mixing apparatus, the mixing apparatus having a drum and a shaft with a drive mechanism, the shaft rotatably mounted in the drum, the method comprising the steps of:

attaching a plurality of mixing tools to the shaft, the mixing tools ending at a small separation from an inside surface of the drum;

adjusting said small separation such that said mixing tools have a larger separation from said inside drum surface in a region leading in a direction of rotation of said tools within the drum than in a region trailing in a direction of rotation of said tools within the drum;

adding bulk chocolate into the drum; and rotating the shaft to press the bulk chocolate between a bottom wall of said mixing tools and said inside surface of the drum, the bulk chocolate first entering into said leading region to experience a pressing force, increasing from said leading region to said trailing region.

2. The method of claim 1, wherein said mixing tools have two curved side walls which join at a tip, end in a line of intersection, widen towards a back region, and are joined by said bottom wall at close separation from said inside drum surface to enhance mixing of the chocolate by frequently exchanging the chocolate pressed between said inside surface and said bottom wall, wherein said bottom wall is smooth, step-free and has a curvature adapted to a curvature of the drum.

3. The method of claim 1, wherein the rotating step comprises sweeping said mixing tools on the shaft entirely over said inside drum surface during a rotation of the shaft through 360°.

4. The method of claim 2, wherein said mixing tools are symmetric with respect to a central axis to create equal distribution of the bulk in the drum.

5. The method of claim 1, wherein the drum is horizontal and has an end wall delimiting a horizontal length of the drum, and said mixing tools immediately adjacent to said end wall have a first side wall further separated from said end wall in a region leading in a direction of rotation of said tools within the drum than in a region trailing in a direction of rotation of said tools within the drum to induce sideward pressing of the bulk chocolate against said end wall.

6. The method of claim 2, wherein said bottom wall has an additional coating material to avoid excessive friction during mixing.

7. The method of claim 5, wherein said first side wall has a surface separated from and adapted to said end wall and wherein said mixing tools immediately adjacent to said end wall have a second side wall opposite said first side wall, said second side wall having a curved surface facing an inner volume of the drum to press the bulk chocolate between said first side wall and said end wall with a pressing force increasing from said leading region to said trailing region and to frequently exchange the chocolate pressed between said first side wall and said end wall.

* * * * *